(12) United States Patent
Tochigi

(10) Patent No.: US 9,604,680 B2
(45) Date of Patent: Mar. 28, 2017

(54) TRUCK FRAME FOR CONSTRUCTION MACHINE

(71) Applicant: HITACHI CONSTRUCTION MACHINERY CO., LTD., Tokyo (JP)

(72) Inventor: Kenichi Tochigi, Tsuchiura (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 0 days.

(21) Appl. No.: 14/881,754

(22) Filed: Oct. 13, 2015

(65) Prior Publication Data

US 2016/0039481 A1    Feb. 11, 2016

Related U.S. Application Data

(62) Division of application No. 14/350,907, filed as application No. PCT/JP2012/078704 on Nov. 6, 2012.

(30) Foreign Application Priority Data

Nov. 14, 2011  (JP) ................................ 2011-248428

(51) Int. Cl.
| | |
|---|---|
| B62D 21/12 | (2006.01) |
| B62D 27/06 | (2006.01) |
| B62D 55/084 | (2006.01) |
| B62D 55/088 | (2006.01) |
| B62D 55/14 | (2006.01) |
| E02F 9/10 | (2006.01) |
| E02F 9/08 | (2006.01) |
| B62D 21/18 | (2006.01) |

(Continued)

(52) U.S. Cl.
CPC ........... *B62D 55/088* (2013.01); *B62D 21/12* (2013.01); *B62D 21/186* (2013.01); *B62D 27/06* (2013.01);
(Continued)

(58) Field of Classification Search
CPC ....... E02F 9/02; E02F 9/08; E02F 9/10; E02F 9/121; B62D 21/12; B62D 21/186;
(Continued)

(56) References Cited

U.S. PATENT DOCUMENTS

| | | | |
|---|---|---|---|
| 2,125,327 A | | 8/1938 | Baker et al. |
| 2,560,307 A | * | 7/1951 | Slemmons ......... B62D 55/0882 305/110 |

(Continued)

FOREIGN PATENT DOCUMENTS

| | | |
|---|---|---|
| EP | 1468901 A2 | 10/2004 |
| JP | 2001-73409 A | 3/2001 |
| WO | 2006/030626 A1 | 3/2006 |

*Primary Examiner* — Joseph Rocca
*Assistant Examiner* — Maurice Williams
(74) *Attorney, Agent, or Firm* — Mattingly & Malur, PC

(57) ABSTRACT

Left and right front flanges are provided respectively in left and right front legs in a center frame. Left and right rear flanges are provided respectively in left and right rear legs in the center frame. Left and right front leg mounting members, and left and right rear leg mounting members, which protrude toward the center frame are provided respectively in left and right side frames. The respective front flanges are placed on the respective front leg mounting members, which are respectively fastened by bolts inserted therebetween in the upper-lower direction. The respective rear flanges are placed on the respective rear leg mounting members, which are respectively fastened by bolts inserted therebetween in the upper-lower direction.

1 Claim, 11 Drawing Sheets

(51) Int. Cl.
  *B62D 55/08* (2006.01)
  *B62D 55/10* (2006.01)
  *E02F 9/12* (2006.01)
  *E02F 9/02* (2006.01)
  *E02F 3/32* (2006.01)

(52) U.S. Cl.
  CPC ............. *B62D 55/08* (2013.01); *B62D 55/10* (2013.01); *E02F 9/08* (2013.01); *E02F 9/10* (2013.01); *B62D 55/084* (2013.01); *E02F 3/32* (2013.01); *E02F 9/02* (2013.01); *E02F 9/121* (2013.01)

(58) Field of Classification Search
  CPC ...... B62D 25/20; B62D 27/06; B62D 55/084; B62D 55/088; B62D 55/10; B62D 55/14
  USPC ........ 305/120, 124, 126, 127–132, 135, 139
  See application file for complete search history.

(56) References Cited

U.S. PATENT DOCUMENTS

| | | | |
|---|---|---|---|
| 3,027,571 A | 6/1962 | Zelle | |
| 3,861,762 A * | 1/1975 | Freedy | B62D 55/30 280/855 |
| 3,899,038 A | 8/1975 | Griffith et al. | |
| 3,907,055 A | 9/1975 | Bertram et al. | |
| 3,998,286 A | 12/1976 | Ponikelsky et al. | |
| 4,014,400 A | 3/1977 | Cline et al. | |
| 4,231,699 A | 11/1980 | Thompson | |
| 4,458,772 A | 7/1984 | Oswald et al. | |
| 5,226,703 A * | 7/1993 | Norman | B62D 55/0882 305/107 |
| 5,725,292 A * | 3/1998 | Keedy | B62D 55/0882 305/107 |
| 5,823,279 A | 10/1998 | Petzold | |
| 7,373,999 B2 * | 5/2008 | Haringer | B62D 49/0678 180/9.48 |
| 7,458,633 B2 | 12/2008 | Takeuchi et al. | |
| 2005/0172527 A1 | 8/2005 | Mimuro et al. | |
| 2007/0290526 A1 | 12/2007 | Takeuchi et al. | |
| 2009/0200859 A1 * | 8/2009 | Matthys | B62D 55/088 305/109 |
| 2009/0256327 A1 * | 10/2009 | Waletzko | B62D 55/084 280/124.155 |
| 2011/0036649 A1 | 2/2011 | Cho et al. | |
| 2012/0146400 A1 * | 6/2012 | Nebergall | B62D 55/0882 305/109 |

\* cited by examiner

TRUCK FRAME FOR CONSTRUCTION MACHINE

CROSS REFERENCE TO RELATED APPLICATION

This application is a divisional application of U.S. application Ser. No. 14/350,907, filed Apr. 10, 2014, the entirety of the contents and subject matter of all of the above is incorporated herein by reference.

TECHNICAL FIELD

The present invention relates to a truck frame for a construction machine that is equipped with a crawler belt, such as a hydraulic excavator, a hydraulic crane or the like, for example.

BACKGROUND ART

In general, a hydraulic excavator as a representative example of a construction machine comprises an automotive lower traveling structure provided with a crawler belt, an upper revolving structure that is mounted on the lower traveling structure to be able to revolve thereon, and a working mechanism that is mounted to the upper revolving structure to be able to tilt thereto. The hydraulic excavator travels on an irregular ground such as a working site or the like, and performs an excavating operation of earth and sand or the like using the working mechanism.

In this case, the lower traveling structure in the hydraulic excavator is regularly configured of a truck frame that is provided with side frames at both sides of a center frame in the left-right direction to extend in the front-rear direction, an idler wheel that is provided on one end side of the side frame in the front-rear direction, and a drive wheel that is provided on the other end side of the side frame in the front-rear direction. A crawler belt is wound around between the idler wheel and the drive wheel.

The center frame in the truck frame has front legs and rear legs that extend in both sides in the left-right direction, and the left and right side frames are positioned at both sides of the center frame in the left-right direction to be formed extending in the front-rear direction, and are respectively mounted to tip ends of the front leg and the rear leg.

Here, some of large-sized hydraulic excavators among the hydraulic excavators have an outer dimension exceeding a width dimension or a height dimension within a range where the hydraulic excavator can travel on a road defined by regulations. Therefore, in a case of transporting the hydraulic excavator to a working site, the hydraulic excavator is regularly divided into the lower traveling structure, the upper revolving structure and the working mechanism, which are individually transported, and are assembled in the working site. Further, in an extremely large-sized hydraulic excavator used in an open-pit mining or the like, only the lower traveling structure exceeds a dimension within a range where the hydraulic excavator can go through the road. Therefore, the lower traveling structure is divided into three pieces configured of the center frame, and left and right side frame assemblies in which the idler wheel, the drive wheel and the crawler belt are incorporated in each of the left and right side frames. Accordingly, the center frame and the left and right side frame assemblies that are thus configured of the three-divided pieces are individually loaded on different vehicles to be transported to a working site, and after that, are assembled in the working site.

Therefore, the truck frame forming part of the lower traveling structure is configured such that the left and right side frames can be mounted to and removed from the front legs and the rear legs of the center frame. In this case, each of the front leg and the rear leg of the center frame has an end surface at the front end side that is formed in a hollow, square shape, and a front end side of each of the front leg and the rear leg is provided with a mounting flange having a protruding portion protruding closer to an outside than the square end surface. On the other hand, each of the left and right side frames comprises an inner surface plate that is positioned in a side of the center frame and with which the mounting flange makes contact, an outer surface plate that is arranged to face the inner surface plate to be spaced therefrom, and an upper surface plate that connects an upper end of the inner surface plate and an upper end of the outer surface plate.

The inner surface plate of the side frame is provided with plural female screws in positions corresponding to the protruding portion of the mounting flange of each of the front leg and the rear leg, and the protruding portion of the mounting flange is provided with bolt through holes in positions corresponding to the respective female screws. The front end side of each of the front leg and the rear leg is provided with a bracket in which plural bolt through holes are formed, and the upper surface plate of the side frame is provided with plural female screws in positions corresponding to the respective bolt through holes of the bracket. In a case of mounting each side frame to the front leg and the rear leg of the center frame, the bolt is inserted in each bolt through hole in the mounting flange of each of the front leg and the rear leg from the inside in the left-right direction, and a front end side of the bolt is screwed into the female screw of the inner surface plate in the side frame. Further, the bolt is inserted into each bolt through hole of the bracket in each of the front leg and the rear leg from above, and a front end side of the bolt is screwed into the female screw of the upper surface plate of the side frame (Patent Document

PRIOR ART DOCUMENT

Patent Document

Patent Document 1: Japanese Patent Laid-Open No. 2001-73409 A

SUMMARY OF THE INVENTION

Incidentally, rocks and the like roll over in a working site where a hydraulic excavator travels. Therefore, there are some cases when the hydraulic excavator goes through across the rock for avoidance at traveling, the rock collides with the truck frame. In this case, since a head portion of the bolt fastening the side frame on each of the front leg and the rear leg of the center frame protrudes inside of the side frame, there is a possibility that, when the rock across which the hydraulic excavator has gone through collides with the bolt, the bolt is damaged (broken, bent or the like). In a state where the bolt is thus bent, it requires labors and hours to perform a removal work of the side frame.

On the other hand, the upper surface plate of the side frame is formed of a flat structure, which therefore is the structure where earth and sand tend to be easily accumulated. Accordingly, upon accumulation of earth and sand thereon, the earth and sand interfere with upper rollers that guide a crawler belt, possibly generating an operation failure or early abrasion of the upper roller. Further, in a case where the accumulated earth and sand are solidified by compression or freezing, there is a problem that a large deal of labors and hours is required to scrape the earth and sand off the upper surface plate of the side frame.

In view of the aforementioned problems in the conventional art, it is an object of the present invention to provide a truck frame for a construction machine that can prevent damages of bolts for fastening side frames to front legs and rear legs of a center frame.

(1) A truck frame for a construction machine according to the present invention comprises a center frame on a central part of which a support cylindrical body is provided and that includes front legs and rear legs at both sides in the left-right direction; and left and right side frames that are respectively positioned at both sides of the center frame in the left-right direction to be formed extending in the front-rear direction and are respectively mounted to tip ends of the front legs and the rear legs, wherein the center frame comprises: an upper plate on an upper surface side of which the support cylindrical body is provided and at both sides in the left-right direction of which upper front leg portions and upper rear leg portions are provided; a lower plate that is arranged to face the upper plate in the upper-lower direction and at both sides in the left-right direction of which lower front leg portions and lower rear leg portions are provided; a front plate that closes a front side position between the upper plate and the lower plate; a rear plate that closes a rear side position between the upper plate and the lower plate; and left and right side plates that respectively close left and right side positions between the upper plate and the lower plate, wherein each of the left and right side frames comprises: an inner surface plate positioned in a side of the center frame; an outer surface plate arranged to face the inner surface plate, to be spaced therefrom; and an upper surface plate that connects an upper end of the inner surface plate and an upper end of the outer surface plate.

In order to solve the aforementioned problems, the constitution adopted by the present invention is characterized in that: front flanges protruding in the front-rear direction from the lower front leg portions are provided in the lower front leg portions forming part of the center frame and rear flanges protruding in the front-rear direction from the lower rear leg portions are provided in the lower rear leg portions, front bolt through holes that penetrate in the upper-lower direction are provided in the front flange and rear bolt through holes that penetrate in the upper-lower direction are provided in the rear flange, a front leg mounting member that protrudes toward the center frame to be mounted to the front flange and a rear leg mounting member that protrudes toward the center frame to be mounted to the rear flange are respectively provided in the inner surface plate forming each of the left and right side frames, and female bolt holes are provided in the front leg mounting member and the rear leg mounting member respectively in positions corresponding to the bolt through holes, wherein in a state where the front and rear flanges of the center frame are placed respectively on the front and rear leg mounting members of the left and right side frames, the bolts are inserted in the bolt through holes and the female bolt holes, thereby mounting the left and right side frames to the center frame.

With this arrangement, since the flanges provided in the front leg and the rear leg of the center frame and the front and rear leg mounting members provided on the inner surface plate of the side frame are mounted by the bolts inserted in the upper-lower direction, the head portion of the bolt can be positioned on an upper surface of each flange. Therefore, it is possible to restrict the rock to make contact with the head portion of the bolt at the traveling of the construction machine to prevent damages, the bending or the like of the bolt. As a result, for example, the bolt can be easily pulled out at the time of removing the side frame from the front leg and the rear leg of the center frame to efficiently perform a removing work of the side frame.

Further, since the front and rear leg mounting members are provided only on the inner surface plates of the left and right side frames, it is possible to mount the leg mounting members at the possible upward side. Therefore, in a state where the front leg and the rear leg of the center frame are respectively mounted on the front and rear leg mounting members, a height dimension from the ground surface to the lower surface of the center frame can be set to be high. Therefore, it is possible to prevent the rock from making contact with the lower surface of the center frame at the traveling of the construction machine to enhance traveling safety of the construction machine.

(2) According to the present invention, each of the front and rear leg mounting members provided in each of the left and right side frames comprises: mounting plates that protrudes from the inner surface plate of each of the left and right side frames toward the center frame and on which each of the front and rear flanges is placed; and a reinforcing plate that is fixed to a lower surface of the mounting plate and the inner surface plate of each of the left and right side frames for reinforcing the mounting plate.

With this arrangement, strength of each leg mounting member can be enhanced. Therefore, the center frame, and the left and right side frames can be strongly mounted to enhance reliability of the construction machine.

(3) According to the present invention, each of the front and rear leg mounting members comprises the mounting plate that is configured of a flat plate extending in the horizontal direction, and the reinforcing plate comprises a flat plate that is arranged in the upper-lower direction to be perpendicular to the lower surface of the mounting plate, wherein the mounting plate and the reinforcing plate are connected to be formed in a T-letter shape.

With this arrangement, the flange can stably be placed on the mounting plate extending in the horizontal direction. Along with it, connecting strength of the mounting plate and the reinforcing plate can be ensured to improve support strength of each leg mounting member.

(4) According to the present invention, the front bolt through holes provided in the respective front flanges of the left and right front legs in the center frame are arranged in the front and rear positions of the lower front leg portions respectively, the rear bolt through holes provided in the respective rear flanges of the left and right rear legs in the center frame are arranged in the front and rear positions of the lower rear leg portions respectively, the female bolt holes provided in the front leg mounting member of each of the left and right side frames are arranged in the front and rear positions of the front leg mounting member respectively to oppose the front bolt through holes, and the female bolt holes provided in the rear leg mounting member of each of the left and right side frames are arranged in the front and rear positions of the rear leg mounting member respectively to oppose the rear bolt through holes.

With this arrangement, the front flange of each of the left and right front legs in the center frame can stably be mounted on the front leg mounting member of each of the left and right side frames by the bolts, and the rear flange of each of the left and right rear legs in the center frame can stably be mounted on the rear leg mounting member of each of the left and right side frames by the bolts.

(5) According to the present invention, each of the left and right side frames has one end side of the front-rear direction provided with an idler wheel and the other end side provided with a drive wheel, the upper surface plate of each of the left and right side frames is provided with a plurality of upper roller devices positioned between the idler wheel and the drive wheel to be spaced from each other, and an inclined cover is provided between the respective upper roller devices to be inclined to an oblique downward side from the inner surface plate toward the outer surface plate, which form part of each of the left and right side frames.

With this arrangement, earth and sand can be discharged along the inclined cover. Thereby, accumulation of earth and sand on the upper surface plate of each of the left and right side frames can be restricted to control interference of the earth and sand with the upper roller device. As a result, the upper roller device can smoothly operate over a long period of time. In addition, since the accumulation of the earth and sand on the upper surface plate of the side frame can be restricted, it is not necessary to wash out earth and sand by use of a great deal of hours and labors, thus making it possible to enhance workability of the washing work.

MODE FOR CARRYING OUT THE INVENTION

Hereinafter, a truck frame for a construction machine according to embodiments in the present invention will be in detail explained with reference to the accompanying drawings, by taking a case of being applied to an extremely large-sized hydraulic excavator as an example thereof. It should be noted that a front side and a rear side of a lower traveling structure change with a revolving position of an upper revolving structure, but in the embodiments, an explanation will be made by defining a side where an idler wheel is provided, as a front side of the truck frame, and a side where a drive wheel is provided, as a rear side of the truck frame.

FIG. 1 to FIG. 8 show a first embodiment of a truck frame for a construction machine according to the present invention.

Figure 1:
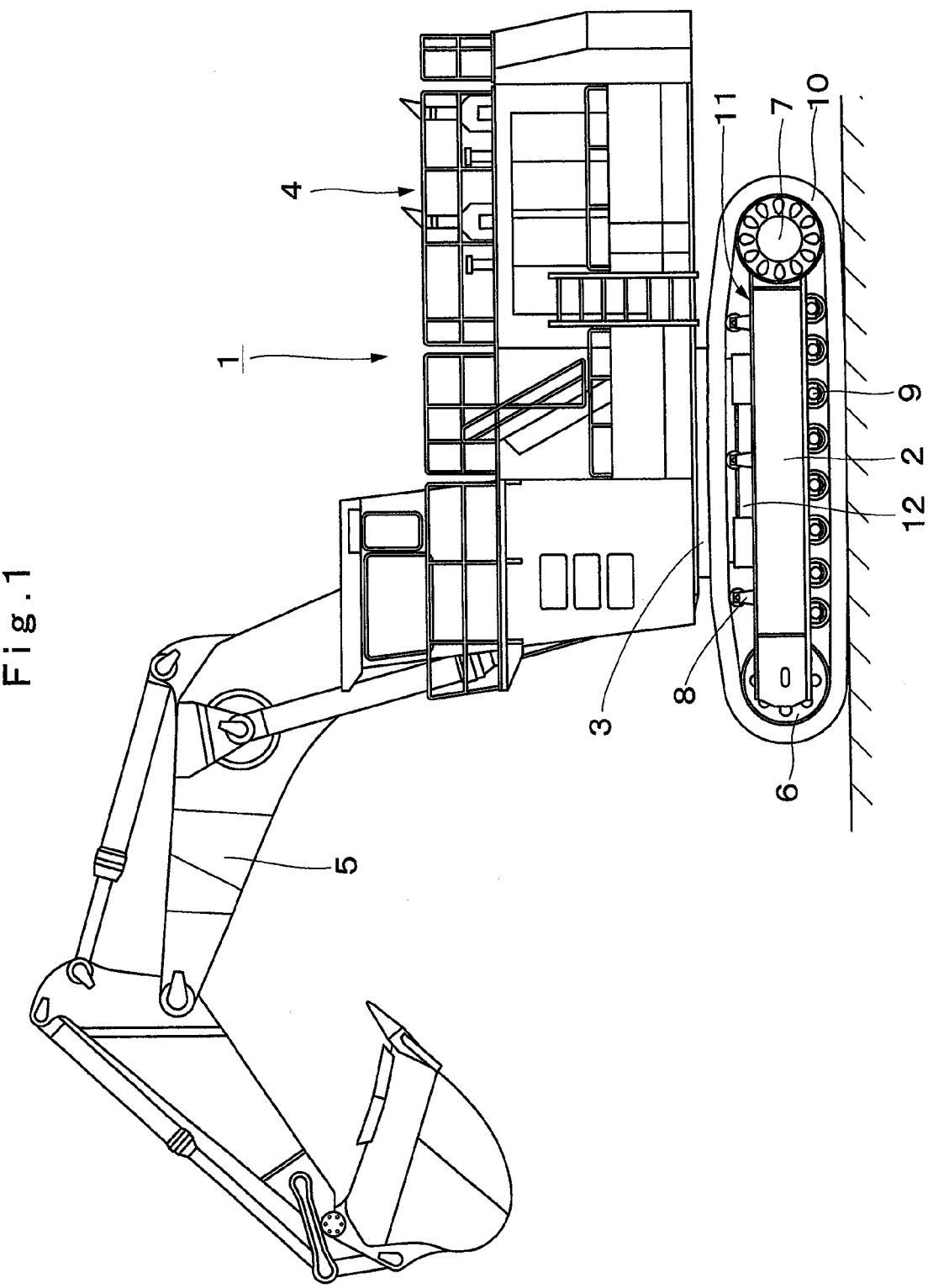
FIG. 1 is a front view showing an extremely large-sized hydraulic excavator provided with a truck frame according to a first embodiment of the present invention.

In FIG. 1, designated at 1 is a hydraulic excavator as a representative example of a construction machine. The hydraulic excavator 1 is configured as an extremely large-sized hydraulic excavator. The hydraulic excavator 1 schematically comprises a crawler type lower traveling structure 2 that is capable of self-traveling, an upper revolving structure 4 that is mounted through a revolving device 3 on the lower traveling structure 2 to be capable of revolving thereon, and a working mechanism 5 that is tiltably provided in the front side of the upper revolving structure 4 thereto for performing an excavating operation of earth and sand, or the like.

Figure 2:
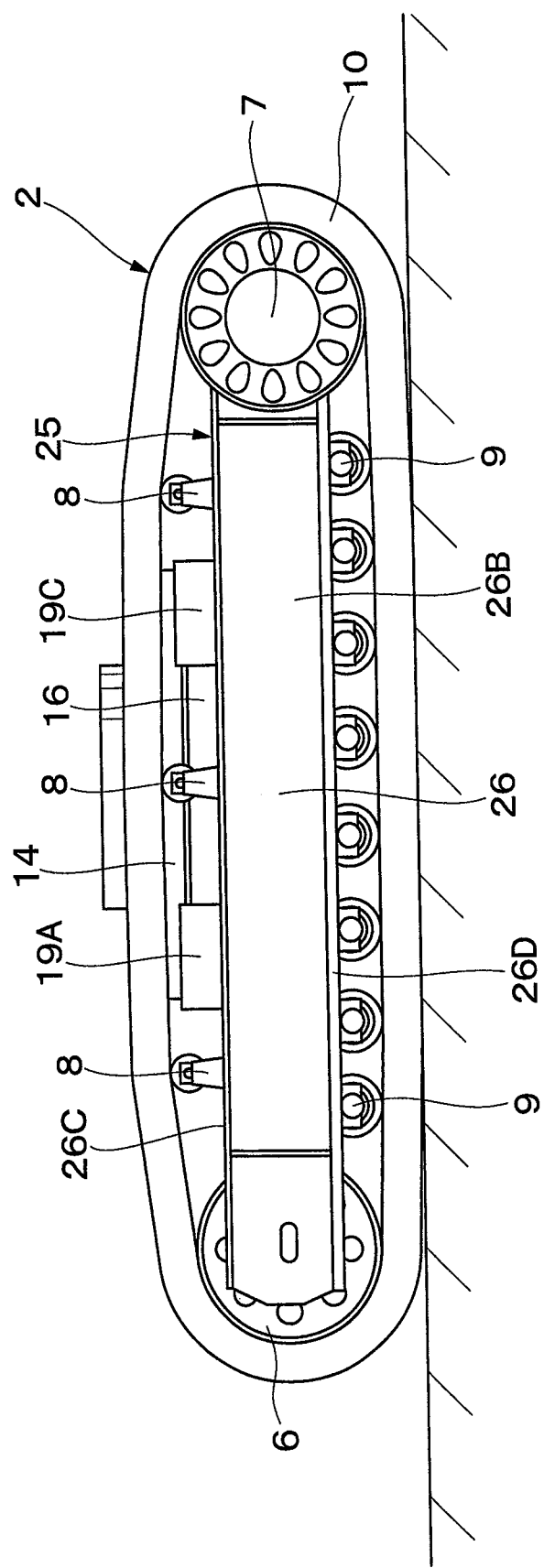
FIG. 2 is a front view shown by enlarging a lower traveling structure in FIG. 1.
Figure 3:
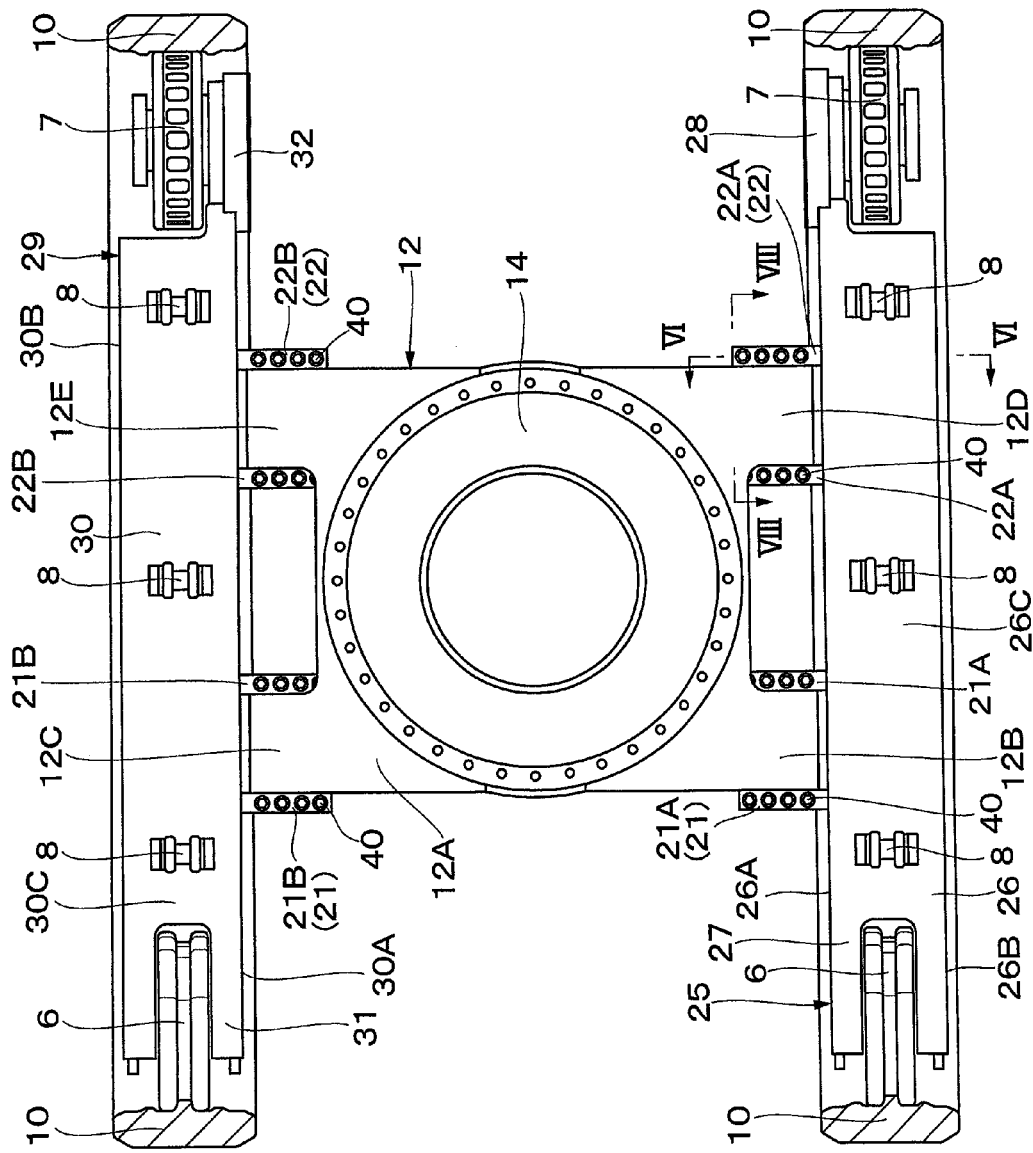
FIG. 3 is a partial cutaway plan view showing a state where side frames and the like are mounted to a center frame.

The crawler type lower traveling structure 2 is provided for traveling on an irregular ground and the like where rocks roll over and a lot of concave and convex portions exist. As shown in FIG. 2 and FIG. 3, the lower traveling structure 2 schematically comprises a truck frame 11, which will be described later, an idler wheel 6 that is provided in a front end side of each of left and right frames 25 and 29, which will be described later, a drive wheel 7 that is provided in a rear end side thereof, a plurality of upper roller devices 8 and lower roller devices 9 that are provided in each of the left and right side frames 25 and 29, and a crawler belt 10 that is provided to be wound across between the idler wheel 6 and the drive wheel 7 and is guided by the upper roller devices 8 and the lower roller devices 9.

Figure 8:
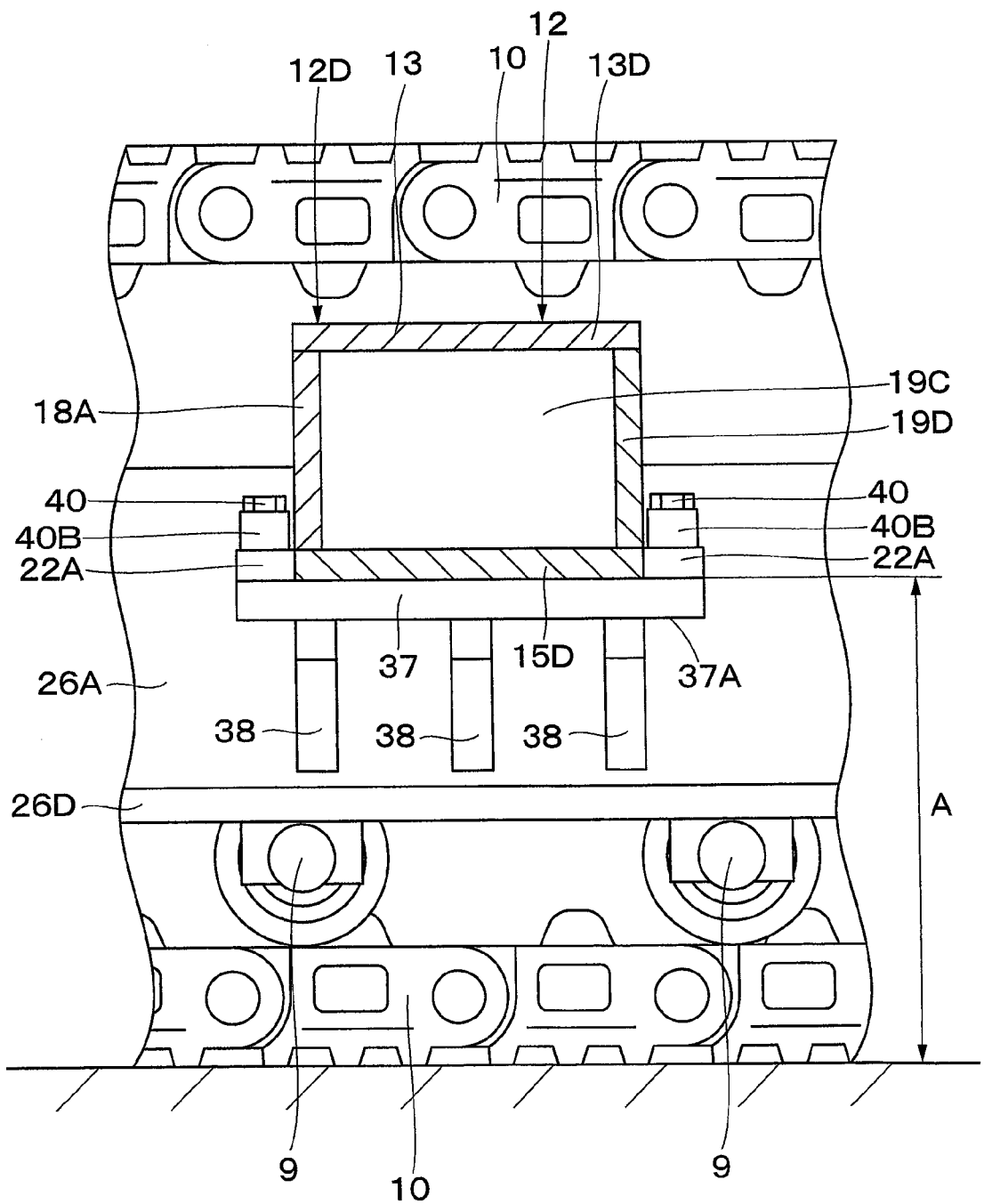
FIG. 8 is a partially enlarged cross section showing a state where the left side frame is mounted to the left rear leg as viewed in a direction of arrows VIII-VIII in FIG. 3.

Next, the configuration of the truck frame 11 of the hydraulic excavator 1 that forms a characteristic part of the present invention will be explained with reference to FIG. 2 and FIG. 8.

Designated at 11 is the truck frame that forms a support structure of the lower traveling structure 2. The truck frame 11 comprises a center frame 12, a left side frame 25, and a right side frame 29, which will be described later.

Figure 4:
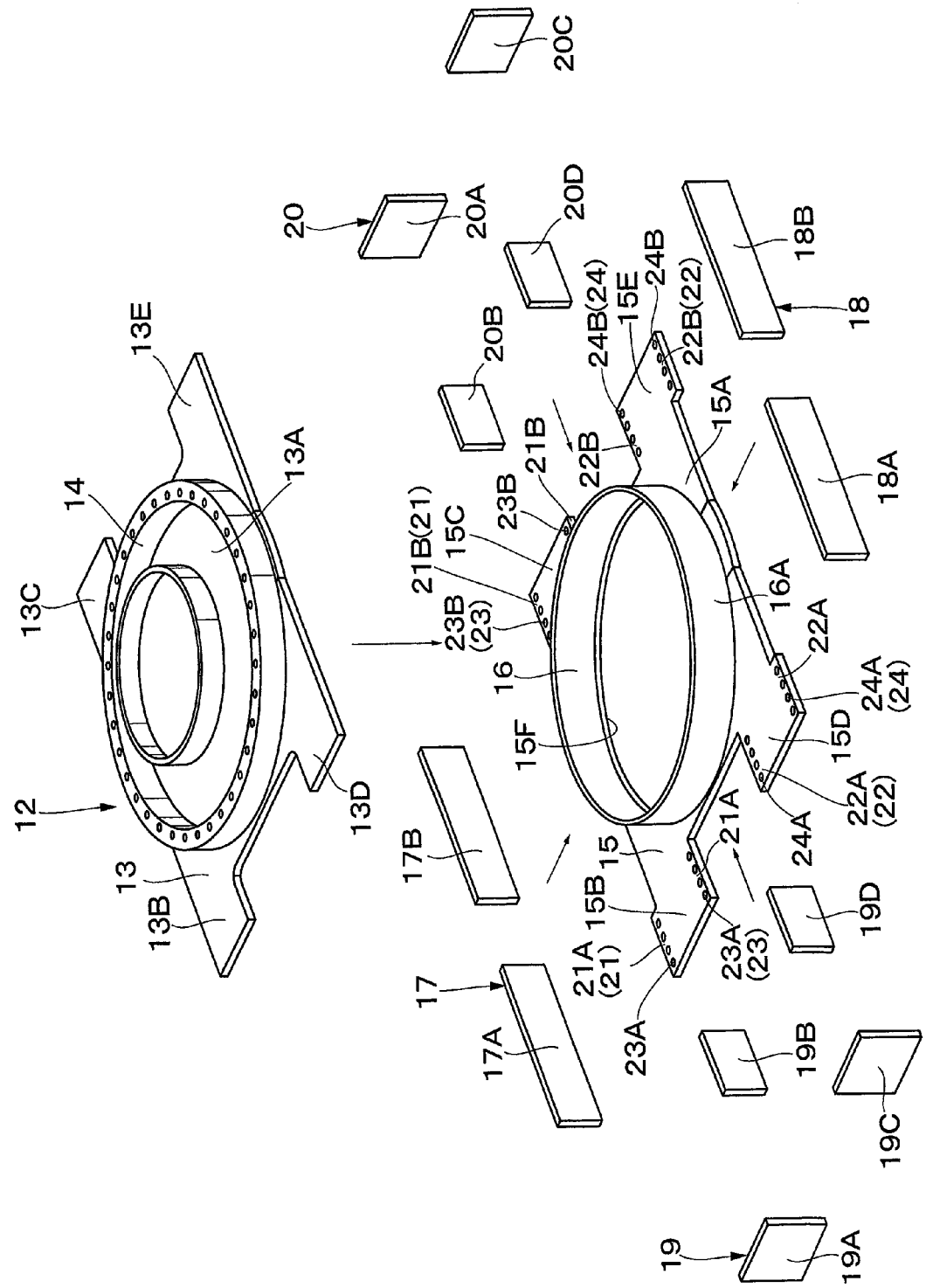
FIG. 4 is an exploded perspective view showing the center frame.

Indicated at 12 is the center frame that forms a central part of the truck frame 11. The center frame 12 comprises a center frame body 12A positioned in the center, a left front leg 12B and a right front leg 12C extending outside in the left-right direction at the front side of the center frame body 12A, and a left rear leg 12D and a right rear leg 12E extending outside in the left-right direction at the rear side of the center frame body 12A to be formed in a substantially H-letter shape as a whole. As shown in FIG. 4, the center frame 12 is formed as a canning structure by welding an upper plate 13, a lower plate 15, a front plate 17, a rear plate 18, a left side plate 19, and a right side plate 20, which will be described later.

The upper plate 13 is provided to close an upper side of the center frame 12, and is formed in a flat shape of a substantially H-letter type as a whole by a steel plate or the like. An upper surface side of the upper plate 13 is provided with a support cylindrical body 14 in a cylindrical shape. Specifically, the upper plate 13 comprises an upper center plate portion 13A in a substantially rectangular shape forming a central part thereof, a left upper front leg portion 13B in a substantially rectangular shape and a right upper front leg portion 13C in a substantially rectangular shape each protruding from a front portion side of the upper center plate portion 13A to both the sides in the left-right direction, and a left upper rear leg portion 13D in a substantially rectangular shape and a right upper rear leg portion 13E in a substantially rectangular shape each protruding from a rear portion side of the upper center plate portion 13A to both the sides in the left-right direction. Thereby, the upper plate 13 is formed as a plate body in a substantially H-letter shape as a whole. An upper surface side of the upper center plate portion 13A is provided with the support cylindrical body 14 formed of a thick cylindrical body. Here, since the revolving device 3 is provided on the support cylindrical body 14, the support cylindrical body 14 rotatably supports the upper revolving structure 4.

The lower plate 15 is arranged to face the upper plate 13 in the upper-lower direction, and is formed as a flat plate in a substantially H-letter shape as similar to the upper plate 13. An upper surface side of the lower plate 15 is provided with a cylindrical middle plate 16 thereon. Specifically, the lower plate 15 comprises a lower center plate portion 15A in a substantially rectangular shape forming a central part thereof, a left lower front leg portion 15B in a substantially rectangular shape and a right lower front leg portion 15C in a substantially rectangular shape each protruding from a front portion side of the lower center plate portion 15A to both the sides in the left-right direction, and a left lower rear leg portion 15D in a substantially rectangular shape and a right lower rear leg portion 15E in a substantially rectangular shape each protruding from a rear portion side of the lower center plate portion 15A to both the sides in the left-right direction. Thereby, the lower plate 15 is formed as a plate body in an H-letter shape as substantially similar to the upper plate 13 as a whole.

On the other hand, a large diameter hole 15F is formed in the central part of the lower center plate portion 15A. An upper surface side of the lower center plate portion 15A is provided with the cylindrical middle plate 16 in a cylindrical shape thereon that surrounds the large diameter hole 15F. The cylindrical middle plate 16 supports the support cylindrical body 14 mounted on the upper plate 13 from under. Left and right front flanges 21A and 21B which will be described later are respectively provided to be integral with a front side and a rear side of each of the left and right lower front leg portions 15B and 15C. Left and right rear flanges 22A and 22B are respectively provided to be integral with a front side and a rear side of each of the left and right lower rear leg portions 15D and 15E.

The front plate 17 connects the upper plate 13 and the lower plate 15 in a state of closing a front side position therebetween. As shown in FIG. 4, the front plate 17 is formed of two sheets of plate bodies in a rectangular shape extending in the left-right direction, and the front plate 17 comprises a left front plate 17A and a right front plate 17B. In the left front plate 17A and the right front plate 17B, opposing sections of each other are welded to an outer peripheral surface 16A of the cylindrical middle plate 16, an upper end portion of each is welded to the upper plate 13 and a lower end portion of each is welded to the lower plate 15. As a result, the front plate 17 is tightly fixed between the upper plate 13 and the lower plate 15.

A rear plate 18 connects the upper plate 13 and the lower plate 15 in a state of closing a rear side position therebetween. As shown in FIG. 4, the rear plate 18 is formed of two sheets of plate bodies in a rectangular shape extending in the left-right direction, and the rear plate 18 comprises a left rear plate 18A and a right rear plate 18B. The left rear plate 18A and the right rear plate 18B face with each other to have the front plate 17 and the cylindrical middle plate 16 therebetween, opposing sections of each other are welded to the outer peripheral surface 16A of the cylindrical middle plate 16, an upper end portion of each is welded to the upper plate 13 and a lower end portion of each is welded to the lower plate 15. As a result, the rear plate 18 is tightly fixed between the upper plate 13 and the lower plate 15.

The left side plate 19 connects the upper plate 13 and the lower plate 15 in a state of closing a left side position therebetween, and the left side plate 19 is formed of four sheets of plate bodies in a rectangular shape. That is, the left side plate 19 comprises a left front side plate 19A that is welded to the left upper front leg portion 13B of the upper plate 13 and the left lower front leg portion 15B of the lower plate 15, a left front middle side plate 19B that faces the left front plate 17A in the front-rear direction and is welded to the left upper front leg portion 13B, the left lower front leg portion 15B and the cylindrical middle plate 16, a left rear side plate 19C that is welded to the left upper rear leg portion 13D of the upper plate 13 and the left lower rear leg portion 15D of the lower plate 15, and a left rear middle side plate 19D that faces the left rear plate 18A in the front-rear direction and is welded to the left upper rear leg portion 13D, the left lower rear leg portion 15D and the cylindrical middle plate 16.

The right side plate 20 connects the upper plate 13 and the lower plate 15 in a state of closing a right side position therebetween, and the right side plate 20 is formed of four sheets of plate bodies in a rectangular shape. That is, the right side plate 20 comprises a right front side plate 20A that is welded to the right upper front leg portion 13C of the upper plate 13 and the right lower front leg portion 15C of the lower plate 15, a right front middle side plate 20B that faces the right front plate 17B in the front-rear direction and is welded to the right upper front leg portion 13C, the right lower front leg portion 15C and the cylindrical middle plate 16, a right rear side plate 20C that is welded to the right upper rear leg portion 13E of the upper plate 13 and the right lower rear leg portion 15E of the lower plate 15, and a right rear middle side plate 20D that faces the right rear plate 18B in the front-rear direction and is welded to the right upper rear leg portion 13E, the right lower rear leg portion 15E and the cylindrical middle plate 16.

Figure 5:
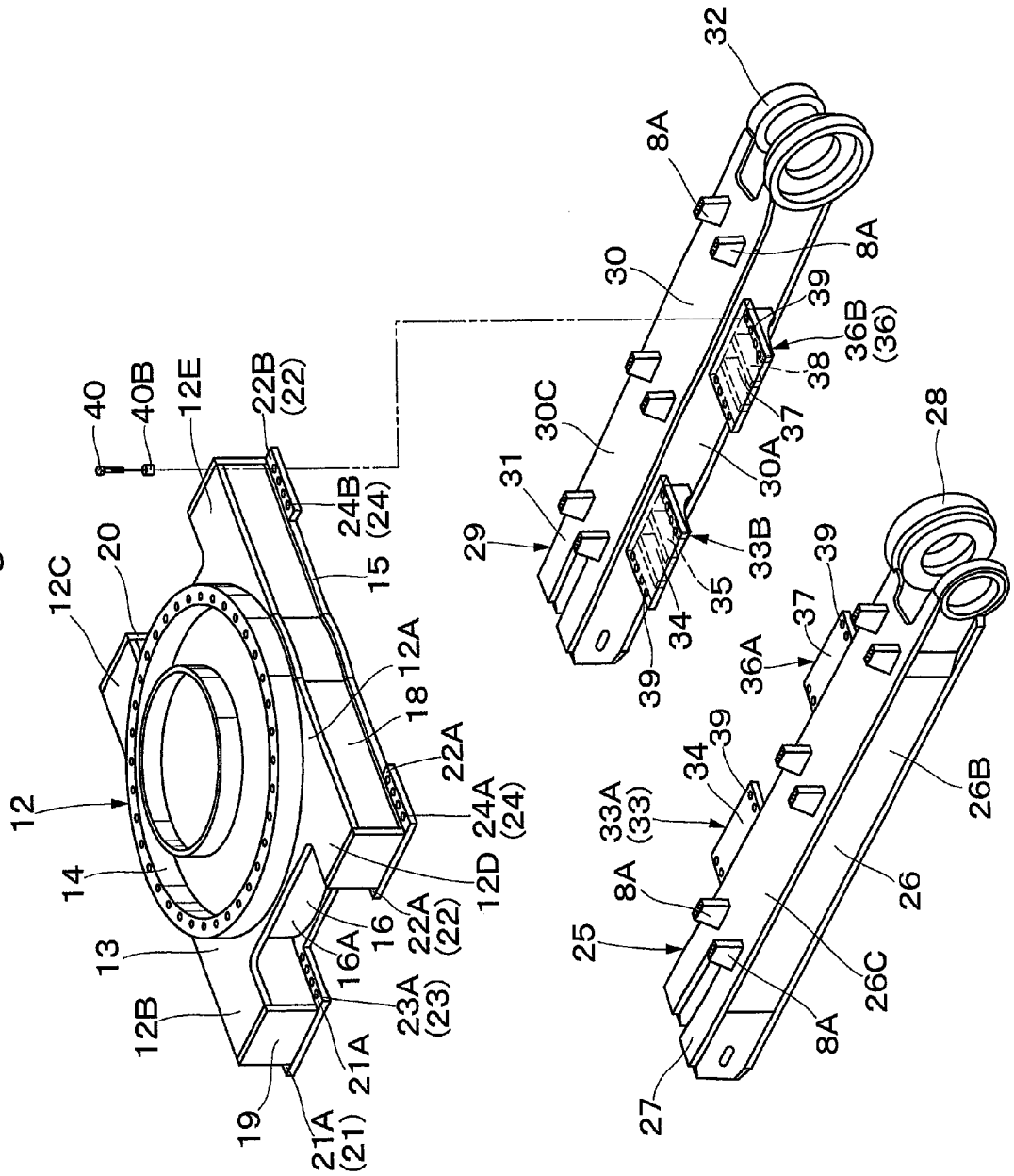
FIG. 5 is an exploded perspective view showing the center frame, and left and right side frames.

That is, the center frame 12 has four sides that are closed by the front plate 17, the rear plate 18, the left side plate 19 and the right sideplate 20 around the cylindrical middle plate 16. As shown in FIG. 3 to FIG. 5, in a state where the center frame 12 is assembled, the left front flange 21A of the front flange 2 which will be described later is formed to protrude respectively closer to the front side than the left front plate 17A of the front plate 17 and closer to the rear side than the left front middle side plate 19B of the left side plate 19. Likewise, the right front flange 21B of the front flange 21 is formed to protrude respectively closer to the front side than the right front plate 17B of the front plate 17 and closer to the rear side than the right front middle side plate 20B of the right side plate 20. The left rear flange 22A of the rear flange 22 is formed to protrude respectively closer to the rear side than the left rear plate 18A of the rear plate 18 and closer to the front side than the left rear middle side plate 19D of the left side plate 19. Likewise, the right rear flange 22B of the rear flange 22 is formed to protrude respectively closer to the rear side than the right rear plate 18B of the rear plate 18 and closer to the front side than the right rear middle side plate 20D of the right side plate 20.

Indicated at 21A and 21B are the left front flange and the right front flange respectively protruding in the front-rear direction from the left and right lower front leg portions 15B and 15C of the lower plate 15 (hereinafter, the left front flange 21A and the right front flange 21B are collectively called the front flange 21). The front flange 21 is arranged at four locations that is a sum of two locations of the left front flanges 21A protruding respectively from the front side and the rear side of the left lower front leg portion 15B, and two locations of the right front flanges 21B protruding respectively from the front side and the rear side of the right lower front leg portion 15C. The left front flange 21A is mounted on a left front leg mounting member 33A of the left side frame 25 which will be described later, and the right front flange 21B is mounted on a right front leg mounting member 33B of the right side frame 29.

Indicated at 22A and 22B are the left rear flange and the right rear flange respectively protruding in the front-rear direction from the left and right lower rear leg portions 15D and 15E of the lower plate 15 (hereinafter, the left rear flange 22A and the right rear flange 22B are collectively called the rear flange 22). The rear flange 22 is arranged at four locations that is a sum of two locations of the left rear flanges 22A protruding respectively from the front side and the rear side of the left lower rear leg portion 15D, and two locations of the right rear flanges 22B protruding respectively from the front side and the rear side of the right lower rear leg portion 15E. The left rear flange 22A is mounted on a left rear leg mounting member 36A of the left side frame 25 which will be described later, and the right rear flange 22B is mounted on a right rear leg mounting member 36B of the right side frame 29.

Indicated at 23A and 23B are left and right front bolt through holes that are respectively provided in the left and right front flanges 21A and 21B of the lower plate 15 (hereinafter, the left front bolt through hole 23A and the right front bolt through hole 23B are collectively called the front bolt through hole 23). Here, the front bolt through hole 23 is provided to penetrate through the front flange 21 in the upper-lower direction (thickness direction). That is, the left front bolt through holes 23A are provided on four locations in the front-side left front flange 21A protruding in the front side from the left lower front leg portion 15B, and are also provided on four locations in the rear-side left front flange 21A protruding in the rear side from the left lower front leg portion 15B. On the other hand, the right front bolt through holes 23B are provided on four locations in the front-side right front flange 21B protruding in the front side from the right lower front leg portion 15C, and are also provided on four locations in the rear-side right front flange 21B protruding in the rear side from the right lower front leg portion 15C.

Indicated at 24A and 24B are left and right rear bolt through holes that are respectively provided in the left and right rear flanges 22A and 22B of the lower plate 15 (hereinafter, the left rear bolt through hole 24A and the right rear bolt through hole 24B are collectively called the rear bolt through hole 24). Here, the rear bolt through hole 24 is provided to penetrate through the rear flange 22 in the upper-lower direction (thickness direction). That is, the left rear bolt through holes 24A are provided on four locations in the front-side left rear flange 22A protruding in the front side from the left lower rear leg portion 15D, and are also provided on four locations in the rear-side left rear flange 22A protruding in the rear side from the left lower rear leg portion 15D. On the other hand, the right rear bolt through holes 24B are provided on four locations in the front-side right rear flange 22B protruding in the front side from the right lower rear leg portion 15E, and are also provided on four locations in the rear-side right rear flange 22B protruding in the rear side from the right lower rear leg portion 15E.

Designated at 25 is the left side frame that is arranged in the left side of the center frame 12. The left side frame 25 is formed to extend in the front-rear direction, and is mounted to a tip end of the left front leg 12B and a tip end of the left rear leg 12D. The left side frame 25 schematically comprises a side frame body 26, an idler wheel bracket 27, and a drive wheel bracket 28, which will be described later.

The side frame body 26 forms part of a base of the left side frame 25. The side frame body 26 comprises an inner surface plate 26A positioned in a side of the center frame 12, an outer surface frame 26B arranged to face the inner surface plate 26A in a state of being spaced therefrom, and a flat upper surface plate 26C connecting an upper end of the inner surface plate 26A and an upper end of the outer surface plate 26B. Thereby, the side frame body 26 is formed in a reverse U-letter shape in transverse section, and lower sides of the respective surface plates 26A and 26B are respectively provided with bottom plates 26D.

The upper surface plate 26C is provided with a plurality of (three) upper roller devices 8 thereon, which are positioned between the idler wheel 6 and the drive wheel 7 to be spaced from each other in the front-rear direction, for guiding the crawler belt 10. The upper roller device 8 comprises a pair of left and right roller mounting portions 8A that are arranged on the upper surface plate 26C as a flat surface, and a roller 8B that is rotatably mounted between the pair of the roller mounting portions 8A.

The idler wheel bracket 27 is provided in the front side in the side frame body 26. As shown in FIG. 3, the idler wheel 6 is mounted through a yoke (not shown) and the like on the idler wheel bracket 27 to be movable in the front-rear direction. On the other hand, the drive wheel bracket 28 is provided in the rear side in the side frame body 26. The drive wheel 7 for driving the crawler belt 10 is mounted on the drive wheel bracket 28.

Indicated at 29 is the right side frame that is arranged in the right side of the center frame 12. The right side frame 29 is formed to extend in the front-rear direction, and is mounted to a tip end of the right front leg 12C and a tip end of the right rear leg 12E. The right side frame 29 is formed to be symmetrical to the aforementioned left side frame 25 in the left-right direction, and schematically comprises, as similar to the left side frame 25, a side frame body 30, an idler wheel bracket 31, and a drive wheel bracket 32.

The side frame body 30 forms part of a base of the right side frame 29. The side frame body 30 comprises an inner surface plate 30A positioned in a side of the center frame 12, an outer surface plate 30B arranged to face the inner surface plate 30A in a state of being spaced therefrom, and a flat upper surface plate 30C connecting an upper end of the inner surface plate 30A and an upper end of the outer surface plate 30B. Thereby, the side frame body 30 is formed in a reverse U-letter shape in transverse section, and lower sides of the respective surface plates 30A and 30B are respectively provided with bottom plates (not shown).

The upper surface plate 30C is provided with a plurality of (three) upper roller devices 8 thereon, which are positioned between the idler wheel 6 and the drive wheel 7 to be spaced from each other in the front-rear direction, for guiding the crawler belt 10. The upper roller device 8 comprises a pair of left and right roller mounting portions 8A that are arranged on the upper surface plate 30C as a flat surface, and a roller 8B that is rotatably mounted between the pair of the roller mounting portions 8A.

The idler wheel bracket 31 is provided in the front side in the side frame body 30. As shown in FIG. 3, the idler wheel 6 is mounted through a yoke (not shown) and the like on the idler wheel bracket 31 to be movable in the front-rear direction. On the other hand, the drive wheel bracket 32 is provided in the rear side in the side frame body 30. The drive wheel 7 for driving the crawler belt 10 is mounted on the drive wheel bracket 32.

Next, front and rear leg mounting members 33 and 36 that are provided in each of the left and right side frames 25 and 29 will be explained.

Designated at 33A and 33B are left and right front leg mounting members that are provided in each of the inner surface plate 26A of the left side frame 25 and the inner surface plate 30A of the right side frame 29 (hereinafter, the left front leg mounting member 33A and the right front leg mounting member 33B are collectively called a front leg mounting member 33). Here, since the left front leg mounting member 33A which is provided in the left side frame 25 and the right front leg mounting member 33B which is provided in the right side frame 29 are formed of the same configuration, hereinafter the left front leg mounting member 33A provided in the left side frame 25 will be explained.

The left front leg mounting member 33A is arranged in the front side (idler wheel bracket 27-side) of the inner surface plate 26A in the side frame body 26 forming part of the left side frame 25, and protrudes horizontally toward the center frame 12. The left front leg mounting member 33A is configured by connecting (welding joint) a mounting plate 34 and a reinforcing plate 35 in a T-letter shape.

That is, the mounting plate 34 is formed in a rectangular flat plate extending horizontally in the front-rear direction by using a steel plate or the like, and has a base end side that is welded to the inner surface plate 26A of the side frame body 26 and a front end side that protrudes toward the left front leg 12B of the center frame 12. The reinforcing plate 35 is formed as a plate body in a substantially triangular shape by using a steel plate or the like, and is fixed to a lower surface (not shown) of the mounting plate 34 and the inner surface plate 26A of the left side frame 25 in the upper-lower direction to be perpendicular to the lower surface (not shown) of the mounting plate 34 for reinforcing the mounting plate 34. The left front flange 21A provided in the left lower front leg portion 15B of the lower plate 15 that forms part of the center frame 12 is placed on the upper surface side of the mounting plate 34.

On the other hand, the right front leg mounting member 33B provided in the inner surface plate 30A of the side frame body 30 that forms part of the right side frame 29 is also configured in the same way as the left front leg mounting member 33A described above, and the right front flange 21B provided in the right lower front leg portion 15C of the lower plate 15 that forms part of the center frame 12 is placed on the upper surface side of the mounting plate 34.

Designated at 36A and 36B are left and right rear leg mounting members that are provided respectively in the inner surface plate 26A of the left side frame 25 and the inner surface plate 30A of the right side frame 29 (hereinafter, the left rear leg mounting member 36A and the right rear leg mounting member 36B are collectively called a rear leg mounting member 36). Here, since the left rear leg mounting member 36A which is provided in the left side frame 25 and the right rear leg mounting member 36B which is provided in the right side frame 29 are formed of the same configuration, hereinafter the left rear leg mounting member 36A provided in the left side frame 25 will be explained.

The left rear leg mounting member 36A is arranged in the rear side (drive wheel bracket 28-side) in the inner surface plate 26A of the side frame body 26 that forms part of the left side frame 25, and protrudes horizontally toward the center frame 12. The left rear leg mounting member 36A is configured by connecting (welding joint) a mounting plate 37 and a reinforcing plate 38 in a T-letter shape.

That is, the mounting plate 37 is formed of a rectangular flat plate extending horizontally in the front-rear direction by using a steel plate or the like, and has a base end side that is welded to the inner surface plate 26A of the side frame body 26 and a front end side that protrudes toward the left rear leg 12D of the center frame 12. The reinforcing plate 38 is formed as a plate body in a substantially triangular shape by using a steel plate or the like, and is fixed to a lower surface 37A of the mounting plate 37 and the inner surface plate 26A of the left side frame 25 in the upper-lower direction to be perpendicular to the lower surface 37A of the mounting plate 37 for reinforcing the mounting plate 37. The left rear flange 22A provided in the left lower rear leg portion 15D of the lower plate 15 that forms part of the center frame 12 is placed on an upper surface side of the mounting plate 37.

On the other hand, the right rear leg mounting member 36B provided in the inner surface plate 30A of the side frame body 30 that forms part of the right side frame 29 is also configured in the same way as the left rear leg mounting member 36A described above, and the right rear flange 22B provided in the right lower rear leg portion 15E of the lower plate 15 that forms part of the center frame 12 is placed on the upper surface side of the mounting plate 37.

Indicated at 39 are female bolt holes provided in each of the front leg mounting member 33 and the rear leg mounting member 36. The female bolt holes 39 are provided in a position corresponding to the front bolt through hole 23 provided in the front flange 21 and in a position corresponding to the rear bolt through hole 24 provided in the rear flange 22.

In the first embodiment, the female bolt holes 39 are provided in the left front leg mounting member 33A of the left side frame 25 in eight locations that are a sum of four holes in each of the front position and the rear position of the left front leg mounting member 33A of the left side frame 25. Similarly, the female bolt holes 39 are provided in the right front leg mounting member 33B of the right side frame 29 in eight locations that area sum of four holes in each of the front position and the rear position of the right front leg mounting member 33B of the right side frame 29.

The female bolt holes 39 are provided in the left rear leg mounting member 36A of the left side frame 25 in eight locations that area sum of four holes in each of the front position and the rear position of the left rear leg mounting member 36A of the left side frame 25. Similarly, the female bolt holes 39 are provided in the right rear leg mounting member 36B of the right side frame 29 in eight locations that are a sum of four holes in each of the front position and the rear position of the right rear leg mounting member 36B of the right side frame 29. Consequently, the female bolt holes 39 are provided at 32 locations in total.

Indicated at 40 is a bolt on an outer periphery of a shaft portion of which a male screw is provided, and the bolts 40 are provided respectively between the front flange 21 (21A and 21B) and the front leg mounting member 33 (33A and 33B) and between the rear flange 22 (22A and 22B) and the rear leg mounting member 36 (36A and 36B) for connection (fixation) of both. The bolt 40 is inserted in the front bolt through hole 23 or the rear bolt through hole 24 through a sleeve 40B from an upper side to a lower side of the front flange 21 or the rear flange 22, and is screwed into the female bolt hole 39 of the front leg mounting member 33 or the rear leg mounting member 36. In this state, the sleeve 40B is interposed between a head portion 40A of the bolt 40 and the front flange 21 or the rear flange 22 in the upper-lower direction.

In case of mounting the left side frame 25 and the right side frame 29 on the center frame 12, the front flanges 21A and 21B provided in the lower front leg portions 15B and 15C of the lower plate 15 forming part of the center frame 12 are placed on the left front leg mounting member 33A provided on the inner surface plate 26A of the left side frame 25, and on the right front leg mounting member 33B provided on the inner surface plate 30A of the right side frame 29, respectively. The rear flanges 22A and 22B provided in the lower rear leg portions 15D and 15E of the lower plate 15 forming part of the center frame 12 are placed on the left rear leg mounting member 36A provided on the inner surface plate 26A of the left side frame 25, and on the right rear leg mounting member 36B provided on the inner surface plate 30A of the right side frame 29, respectively. In this state, the front bolt through holes 23A and 23B and the rear bolt through holes 24A and 24B provided in the front flanges 21A and 21B and the rear flanges 22A and 22B, and the female bolt holes 39 provided in the front leg mounting members 33A and 33B and the rear leg mounting members 36A and 36B are positioned on the same axis line to be screwed through the bolts 40. Therefore, the left side frame 25 and the right side frame 29 can be mounted to the center frame 12.

The hydraulic excavator 1 according to the first embodiment has the configuration as described above, and an explanation will be made of a work where the lower traveling structure 2 of the extremely large-sized hydraulic excavator 1 is divided to be transported, and the lower traveling structure 2 that has been divided will be assembled in a working site.

In a case of transporting the large-sized hydraulic excavator 1 to a working site, for example, the lower traveling structure 2 is divided into three pieces of the center frame 12, a left side frame assembly in which the idler wheel 6, the drive wheel 7, the crawler belt 10 and the like are incorporated on the left side frame 25, and a right side frame assembly in which the idler wheel 6, the drive wheel 7, the crawler belt 10 and the like are incorporated on the right side frame 29. The center frame 12, the assembly of the left side frame 25, and the assembly of the right side frame 29 are individually loaded on different vehicles to be transported to the working site.

In the working site, the assembly work of the center frame 12, the left side frame 25 and the right side frame 29 will be performed.

In a case of mounting the left side frame 25 to the center frame 12, the center frame 12 is lifted up, the left front side plate 19A of the left front leg 12B and the left rear side plate 19C of the left rear leg 12D are caused to make contact with the inner surface plate 26A of the left side frame 25. In this state, the left front flange 21A provided in the left lower front leg portion 15B of the lower plate 15 is placed on the mounting plate 34 of the left front leg mounting member 33A provided in the inner surface plate 26A of the left side frame 25. Along with it, the left rear flange 22A provided in the left lower rear leg portion 15D of the lower plate 15 is placed on the mounting plate 37 of the left rear leg mounting member 36A provided in the inner surface plate 26A of the left side frame 25. At this time, the left front bolt through hole 23A of the left front flange 21A and the female bolt hole 39 of the left front leg mounting member 33A are positioned on the same axis line, and similarly the left rear bolt through hole 24A of the left rear flange 22A and the female bolt hole 39 of the left rear leg mounting member 36A are positioned on the same axis line.

Next, the bolt 40 is inserted in the left front bolt through hole 23A through the sleeve 40B from an upper side of the left front flange 21A, and the bolt 40 is screwed in the female bolt hole 39 of the left front leg mounting member 33A. The bolt 40 is inserted in the left rear bolt through hole 24A through the sleeve 40B from an upper side of the left rear flange 22A, and the bolt 40 is screwed in the female bolt hole 39 of the left rear leg mounting member 36A. Thereby, the left side frame 25 is mounted to be integral with the left front leg 12B and the left rear leg 12D of the center frame 12.

On the other hand, in a case of mounting the right side frame 29 on the center frame 12, the center frame 12 is lifted up, and the right front side plate 20A of the right front leg 12C and the right rear side plate 20C of the right rear leg 12E are caused to make contact with the inner surface plate 30A of the right side frame 29. In this state, the right front flange 21B provided in the right lower front leg portion 15C of the lower plate 15 is placed on the mounting plate 34 of the right front leg mounting member 33B provided in the inner surface plate 30A of the right side frame 29. Along with it, the right rear flange 22B provided in the right lower rear leg portion 15E of the lower plate 15 is placed on the mounting plate 37 of the right rear leg mounting member 36B provided in the inner surface plate 30A of the right side frame 29. At this time, the right front bolt through hole 23B of the right front flange 21B and the female bolt hole 39 of the right front leg mounting member 33B are positioned on the same axis line, and similarly the right rear bolt through hole 24B of the right rear flange 22B and the female bolt hole 39 of the right rear leg mounting member 36B are positioned on the same axis line.

Next, the bolt 40 is inserted in the right front bolt through hole 23B through the sleeve 40B from an upper side of the right front flange 21B, and the bolt 40 is screwed in the female bolt hole 39 of the right front leg mounting member 33B. The bolt 40 is inserted in the right rear bolt through hole 24B through the sleeve 40B from an upper side of the right rear flange 22B, and the bolt 40 is screwed in the female bolt hole 39 of the right rear leg mounting member 36B. Thereby, the right side frame 29 is mounted to be integral with the right front leg 12C and the right rear leg 12E of the center frame 12.

When the left side frame 25 and the right side frame 29 are mounted to the center frame 12 to assemble the lower traveling structure 2, the upper revolving structure 4 and the working mechanism 5 are in turn assembled on the upper side of the lower traveling structure 2, thus making it possible to assemble the hydraulic excavator 1.

At the traveling of the hydraulic excavator 1 assembled as described above, the drive wheel 7 is driven for rotation, which causes the crawler belt 10 to circle around between the drive wheel 7 and the idler wheel 6. Thereby, the hydraulic excavator 1 travels to an excavating site, and an excavating operation of earth and sand or the like can be performed by tilting the working mechanism 5 in this excavating site.

Here, in working sites where the hydraulic excavator 1 travels, most of them are irregular grounds where obstacles of rocks and the like roll over. Therefore, there are some cases where the rock collides with the truck frame 11 at the time of going through across the rock at traveling. In this case, as in the case of the conventional art, when the head portion of the bolt connecting between the center frame and the left and right side frames protrudes in the inner side of each side frame in the left-right direction, there is a possibility that the rock which the hydraulic excavator 1 has gone through collides with the head portion of the bolt to damage (break, bend or the like) the bolt.

On the other hand, according to the first embodiment, the left front flange 21A provided in the left lower front leg portion 15B of the lower plate 15 forming part of the center frame 12 is placed on the left front leg mounting member 33A provided in the inner surface plate 26A of the left side frame 25. Along with it, the left rear flange 22A provided in the left lower rear leg portion 15D of the lower plate 15 is placed on the left rear leg mounting member 36A provided in the inner surface plate 26A of the left side frame 25. In this state, the bolts 40 are inserted in the left front bolt through hole 23A and the left rear bolt through hole 24A provided in the left front flange 21A and the left rear flange 22A from upward to downward. Next, the bolts 40 are screwed in the female bolt holes 39 provided in the left front leg mounting member 33A and the left rear leg mounting member 36A, and thereby the left side frame 25 can be mounted to the center frame 12.

A case of mounting the right side frame 29 on the center frame 12 is also similar to that of the left side frame 25. That is, the right front flange 21B provided in the right lower front leg portion 15C of the lower plate 15 forming part of the center frame 12 is placed on the right front leg mounting member 33B provided in the inner surface plate 30A of the right side frame 29. Along with it, the right rear flange 22B provided in the right lower rear leg portion 15E of the lower plate 15 is placed on the right rear leg mounting member 36B provided in the inner surface plate 30A of the right side frame 29. In this state, the bolts 40 are inserted in the right front bolt through hole 23B and the right rear bolt through hole 24B provided in the right front flange 21B and the right rear flange 22B from upward to downward. Next, the bolts 40 are screwed in the female bolt holes 39 provided in the right front leg mounting member 33B and the right rear leg mounting member 36B, and thereby the right side frame 29 can be mounted to the center frame 12.

Figure 6:
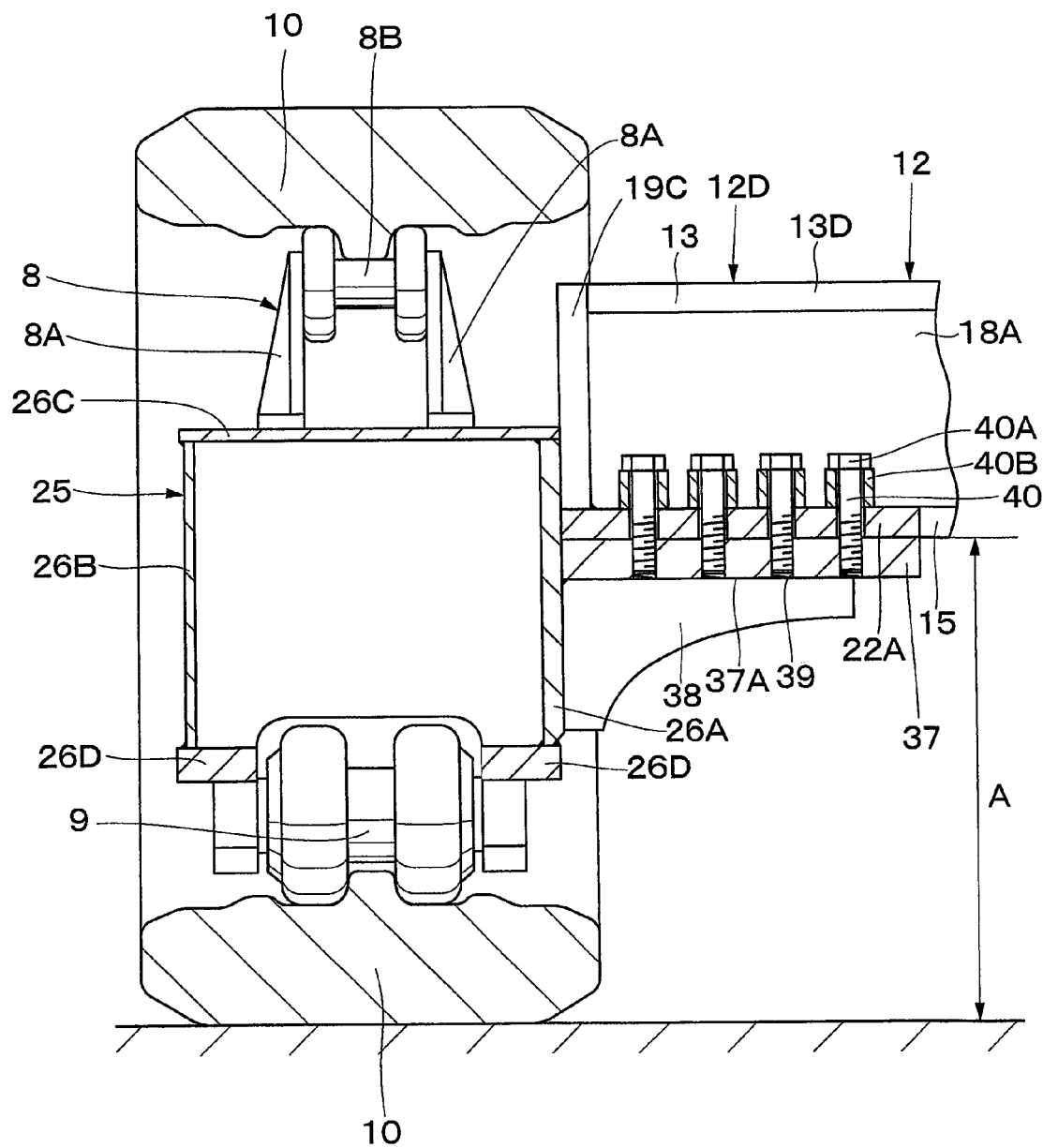
FIG. 6 is a partially enlarged cross section showing a state where the left side frame is mounted to a left rear leg as viewed in a direction of arrows VI-VI in FIG. 3.
Figure 7:
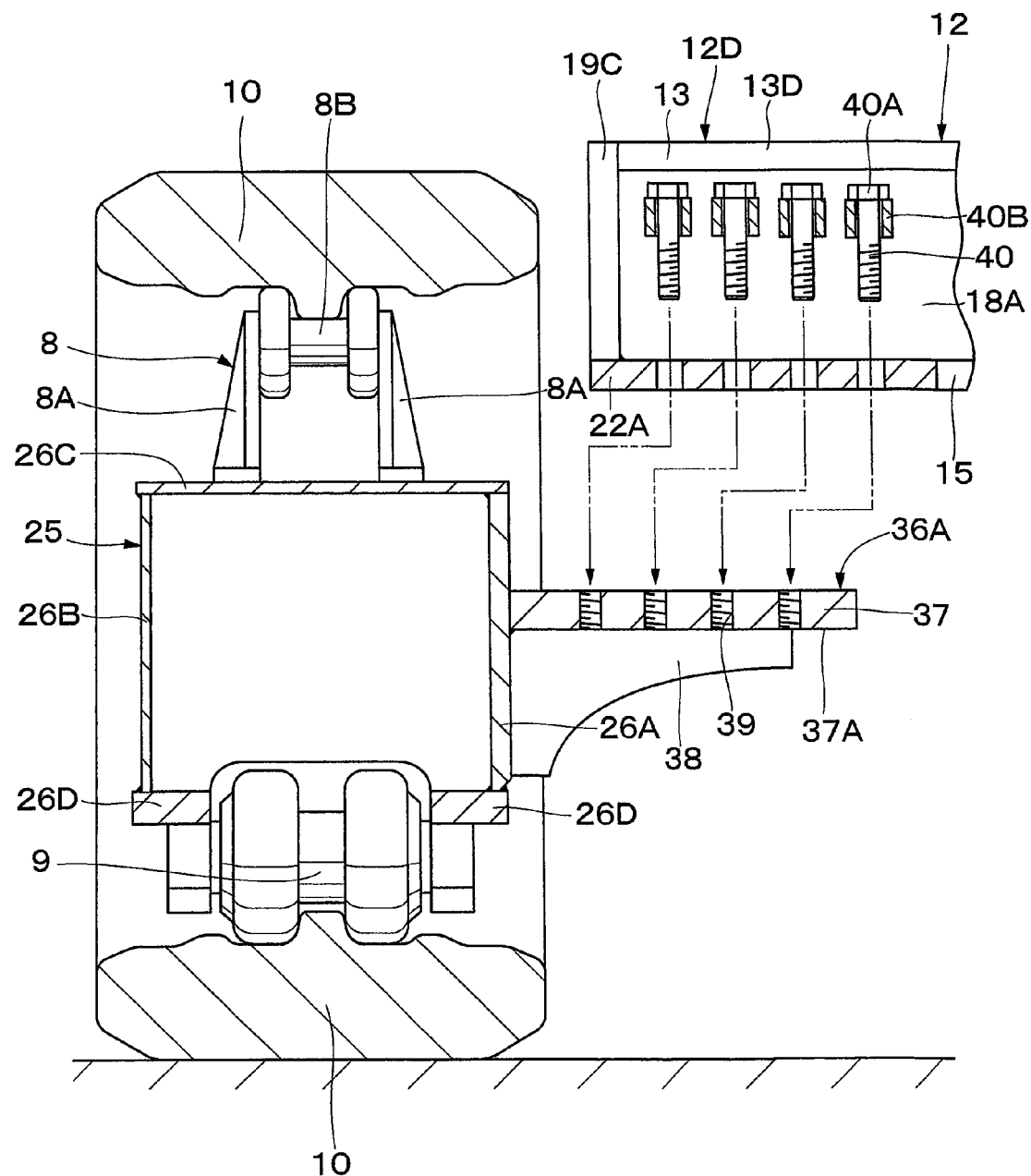
FIG. 7 is a cross section showing a state where the left rear leg and the left side frame are exploded at the same position with that of FIG. 6.

Accordingly, the head portions 40A of the bolts 40 for mounting the left side frame 25 and the right side frame 29 to the center frame 12 protrude from upper surfaces of the left and right front flanges 21A and 21B and the left and right rear flanges 22A and 22B. In addition, as shown in FIG. 6, the lower ends of the bolts 40 can be accommodated upward of lower surfaces 37A of the mounting plates 37 of the rear leg mounting members 33 and 36 (not protrude from the lower surfaces 37A). Similarly, the lower ends of the bolts 40 can be accommodated upward of lower surfaces (not shown) of the mounting plates 34 of the front leg mounting members 33 (not protrude from the lower surfaces 34). As a result, it is possible to be difficult for the rock to make contact with the head portion 40A of the bolt 40 at the traveling of the hydraulic excavator 1 to prevent damages, bending or the like of the bolt 40. Thereby, for example, the bolt can easily be pulled out at the time of removing the left and right side frames 25 and 29 from the front legs 12B and 12C and the rear legs 12D and 12E of the center frame 12, thus performing a removal work of the left and right side frames 25 and 29 efficiently.

On the other hand, since the front leg mounting member 33 and the rear leg mounting member 36 are respectively provided in each of the inner surface plates 26A and 30A of the respective side frames 25 and 29, each of the upper surface plates 26C and 30C of the side frames 25 and 29 can be configured as a flat surface. Therefore, even if earth and sand kicked up by the crawler belt 10 are accumulated on the upper surface plates 26C and 30C of the left and right side frames 25 and 29, an operator can easily scrape the earth and sand at the time of performing a cleaning work of the hydraulic excavator 1.

According to the first embodiment, since the front leg mounting member 33 (33A and 33B) and the rear leg mounting member 36 (36A and 36B) are respectively provided only in the inner surface plate 26A of the left side frame 25 and in the inner surface plate 30A of the right side frame 29, the front leg mounting member 33 and the rear leg mounting member 36 can be mounted as upward as possible. Therefore, in a case of mounting the front legs 12B and 12C and the rear legs 12D and 12E of the center frame 12 on the front and rear leg mounting members 33 and 36, a height dimension A from the ground surface to the lower surface of the center frame 12 can be set to be high (refer to FIG. 6). Thereby, it is possible to reduce contact of rocks or the like with the lower surface of the center frame 12 at the traveling of the hydraulic excavator 1 to enhance traveling stability of the hydraulic excavator 1.

Figure 9:
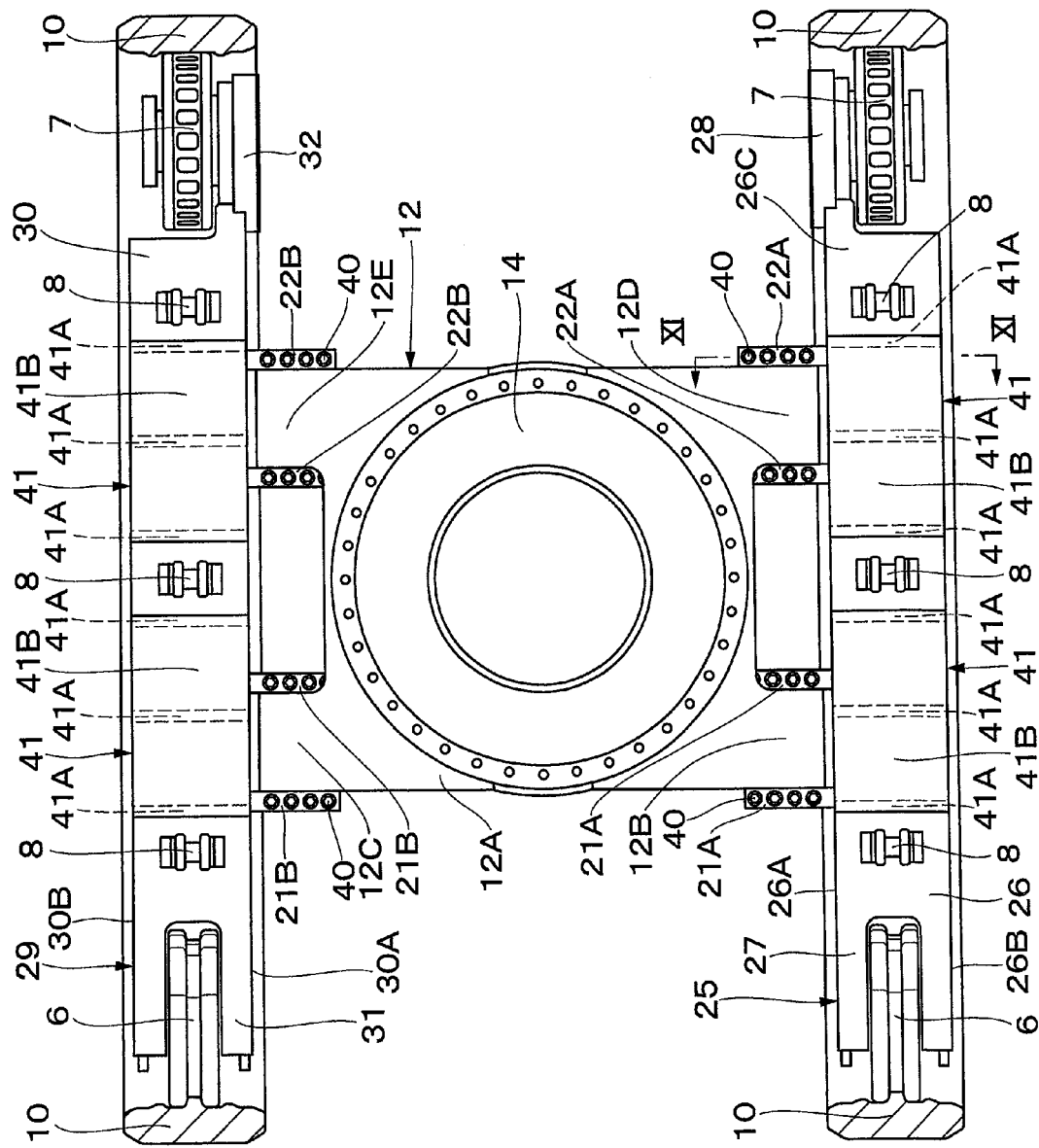
FIG. 9 is a plan view showing a truck frame according to a second embodiment of the present invention as similar to FIG. 3.
Figure 10:
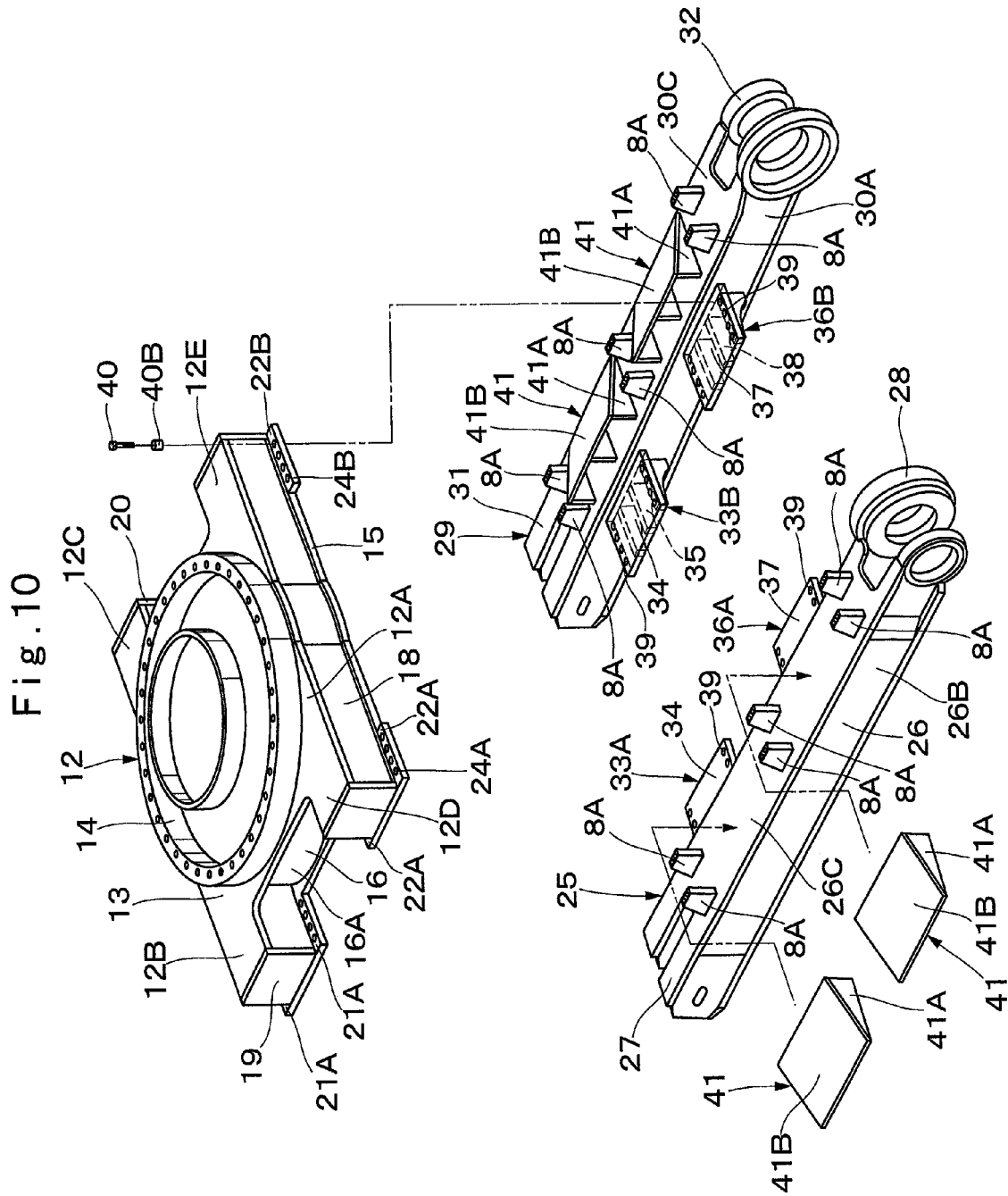
FIG. 10 is an exploded perspective view showing a center frame, left and right side frames, inclined covers and the like in FIG. 9.
Figure 11:
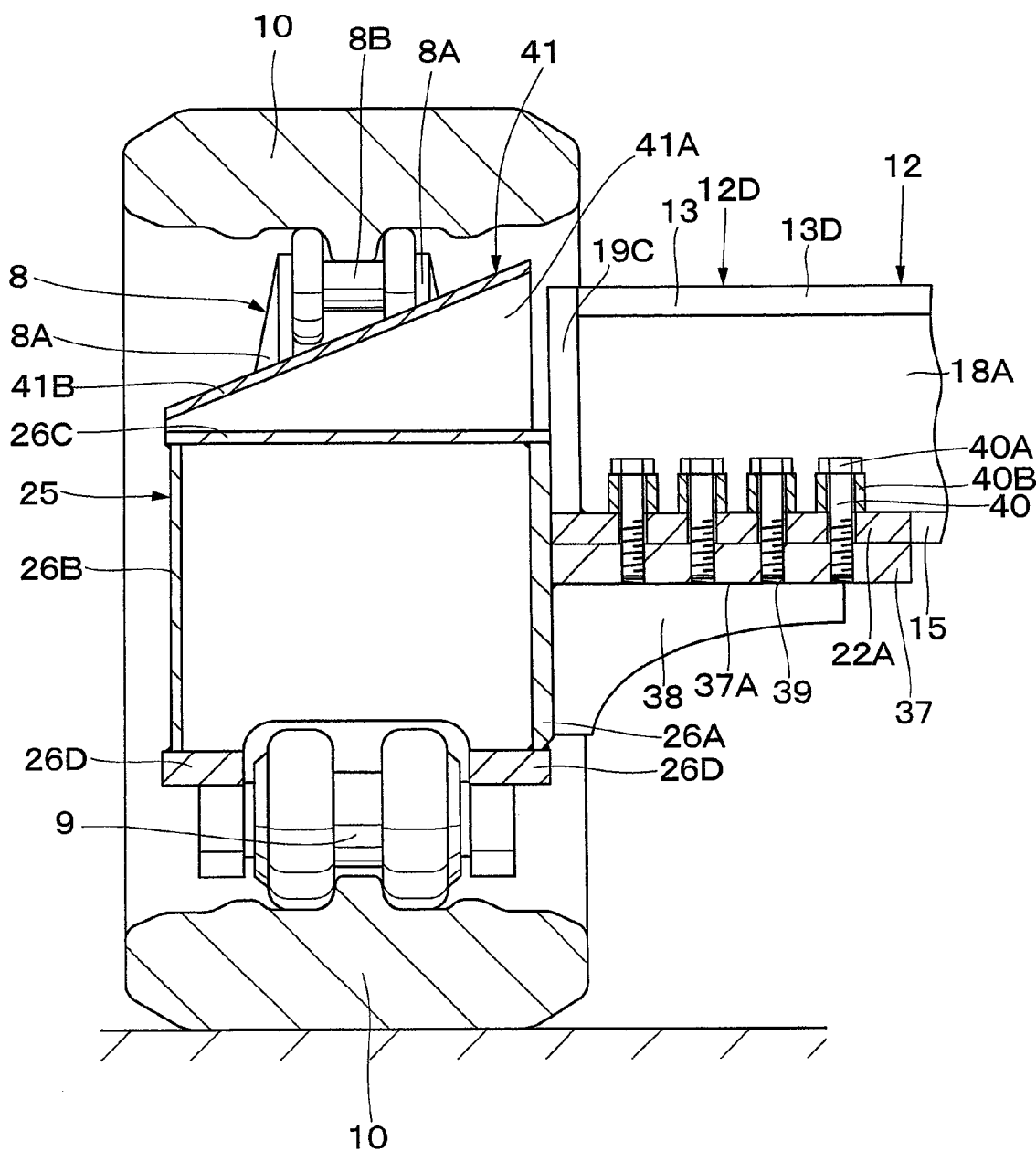
FIG. 11 is a partially enlarged cross section showing the center frame, the side frame, the inclined cover and the like as viewed in a direction of arrows XI-XI in FIG. 9.

Next, FIG. 9 to FIG. 11 show a second embodiment of the present invention. The present embodiment is characterized in that an inclined cover is provided for preventing earth and sand from being accumulated on the upper surface of each of the left and right side frames. It should be noted that in the embodiment, the component elements that are identical to those of the foregoing first embodiment as described above will be simply denoted by the same reference numerals to avoid repetitions of similar explanations.

Designated at 41 are the inclined covers that are provided respectively on the upper surface plate 26C of the left side frame 25 and the upper surface plate 30C of the right side frame 29.

Two inclined covers 41 are provided to have an interval therebetween in the front-rear direction on the upper surface plate 26C of the left side frame 25, and the two inclined covers 41 are provided to have an interval therebetween in the front-rear direction on the upper surface plate 30C of the right side frame 29.

Here, the inclined cover 41 comprises three support plates 41A and one inclined plate 41B. That is, the inclined cover 41 comprises the three support plates 41A each of which is formed as a plate body in a triangular shape using a steel plate or the like and is provided to rise on each of the upper surface plate 26C of the left side frame 25 and the upper surface plate 30C of the right side frame 29, and the inclined plate 41B that is formed as a rectangular flat plate extending in the front-rear direction using a steel plate or the like, and is inclined in an oblique downward side by being fixed on an upper end of each of the support plates 41A.

In the second embodiment, the two inclined covers 41 are arranged between the three upper roller devices 8 on the upper surface plate 26C of the left side frame 25, and the inclined plate 41B of each inclined cover 41 is inclined in the oblique downward side from the inner surface plate 26A toward the outer surface plate 26B of the left side frame 25. On the other hand, the two inclined covers 41 are arranged between the three upper roller devices 8 on the upper surface plate 30C of the right side frame 29, and the inclined plate 41B of each inclined cover 41 is inclined in the oblique downward side from the inner surface plate 30A toward the outer surface plate 30B of the right side frame 29.

In the hydraulic excavator 1 according to the second embodiment, the inclined covers 41 are provided in each of the upper surface plates 26C and 30C of the left and right side frames 25 and 29. Accordingly, even in a case where the earth and sand attached to the crawler belt 10 at the working of the hydraulic excavator 1 drop down toward the respective upper surface plates 26C and 30C of the side frames 25 and 29, it is possible to drop down the earth and sand along the inclined plate 41B of the inclined cover 41. Therefore, it is possible to restrict earth and sand to be accumulated on the respective upper surface plates 26C and 30C of the left and right side frames 25 and 29 to restrict interference of the earth and sand with the upper roller device 8. As a result, the upper roller device 8 can smoothly operate over a long period of time. In addition, since it is possible to restrict earth and sand to be accumulated on the respective upper surface plates 26C and 30C of the left and right side frames 25 and 29, it is not necessary to use a great deal of labors and hours for cleaning the accumulated earth and sand to enhance workability of the cleaning work to the hydraulic excavator 1.

It should be noted that in the second embodiment, the inclined cover 41 is explained to be formed as a member different from the left and right side frames 25 and 29, and the inclined cover 41 formed of the different member is explained to be fixed on each of the upper surface plate 26C of the left side frame 25 and the upper surface plate 30C of the right side frame 29. However, the present invention is not limited thereto, but, for example, the upper surface plate 26C of the left side frame 25 may be formed as an inclined surface inclined downward from the inner surface plate 26A to the outer surface plate 26B, and the upper surface plate 30C of the right side frame 29 may be formed as an inclined surface inclined downward from the inner surface plate 30A to the outer surface plate 30B.

In each of the above embodiments, the respective front flanges 21A and 21B provided in the respective front legs 12B and 12C of the center frame 12, and the mounting plates 34 of the respective front leg mounting members 33A and 33B provided in the left and right side frames 25 and 29 are respectively fastened by eight bolts 40. On the other hand, the respective rear flanges 22A and 22B provided in the respective rear legs 12D and 12E of the center frame 12 and the mounting plates 37 of the respective rear leg mounting members 36A and 36B provided in the left and right side frames 25 and 29 are respectively fastened by eight bolts 40. However, the present invention is not limited thereto, and the respective sections may be fastened by nine or more bolts 40, or by seven or less bolts 40.

Each of the embodiments described above is explained by exemplifying the truck frame 11 of the lower traveling structure 2 provided in the large-sized hydraulic excavator 1 as a truck frame of a lower traveling structure. However, the present invention is not limited thereto, but may be applied to a hydraulic excavator of a middle size or small size. Further, the present invention may be applied to a working vehicle a lower traveling structure of which is provided with a truck frame, for example, a hydraulic crane or the like.

DESCRIPTION OF REFERENCE NUMERALS

1: Hydraulic excavator (Construction machine)
2: Lower traveling structure
6: Idler wheel
7: Drive wheel
8: Upper roller device
10: Crawler belt
11: Truck frame
12: Center frame
12A: Center frame body
12B: Left front leg
12C: Right front leg
12D: Left rear leg
12E: Right rear leg
13: Upper plate
13A: Upper center plate portion
13B, 13C: Upper front leg portion
13D, 13E: upper rear leg portion
14: Support cylindrical body
15: Lower plate
15A: Lower center plate portion
15B, 15C: Lower front leg portion
15D, 15E: Lower rear leg portion
17: Front plate
18: Rear plate
19: Left side plate
20: Right side plate
21: Front flange
21A: Left front flange
21B: Right front flange
22: Rear flange
22A: Left rear flange
22B: Right rear flange
23: Front bolt through hole
23A: Left front bolt through hole
23B: Right front bolt through hole
24: Rear bolt through hole
24A: Left rear bolt through hole
24B: Right rear bolt through hole
25: Left side frame
26, 30: Side frame body
26A, 30A: Inner surface plate
26B, 30B: Outer surface plate
26C, 30C: Upper surface plate
26D: Bottom plate
29: Right side frame
33: Front leg mounting member
33A: Left front leg mounting member
33B: Right front leg mounting member
34, 37: Mounting plate
35, 38: Reinforcing plate
36: Rear leg mounting member
36A: Left rear leg mounting member
36B: Right rear leg mounting member
39: Female bolt hole
40: Bolt
41: Inclined cover

The invention claimed is:

1. A truck frame for a construction machine comprising:
a center frame on a central part of which a support cylindrical body is disposed, and that includes front legs and rear legs disposed at both sides in left-right directions thereof; and
left and right side frames that are respectively positioned at sides of said center frame in the left-right directions to be formed extending in the front-rear directions and are respectively mounted to ends of said front legs and said rear legs,
wherein said center frame comprises:
an upper plate on an upper surface side of which said support cylindrical body is disposed, and at both sides in the left-right directions of which upper front leg portions and upper rear leg portions are disposed;
a lower plate that is arranged to face said upper plate in the upper-lower directions and at both sides in the left-right directions of which lower front leg portions and lower rear leg portions are disposed;
a front plate that closes a front side position between said upper plate and said lower plate;

a rear plate that closes a rear side position between said upper plate and said lower plate; and left and right side plates that respectively close left and right side positions between said upper plate and said lower plate, wherein each of said left and right side frames comprises:

an inner surface plate positioned on a side of said center frame;

an outer surface plate arranged to face said inner surface plate to be spaced therefrom; and an upper surface plate that connects an upper end of said inner surface plate and an upper end of said outer surface plate, wherein said center frame further comprises:

front flanges protruding in the front-rear directions from said lower front leg portions and rear flanges protruding in the front-rear directions from said lower rear leg portions; and front bolt through holes that penetrate said front flanges in the upper-lower directions and rear bolt through holes that penetrate said rear flanges in the upper-lower directions, wherein each of said left and right side frames further comprises:

a front leg mounting member that protrudes toward said center frame to be mounted to one of said front flanges and a rear leg mounting member that protrudes toward said center frame to be mounted to one of said rear flanges are respectively disposed in said inner surface plate; and female bolt holes are disposed on said front leg mounting member and said rear leg mounting member respectively in positions corresponding to said front bolt through holes and said rear bolt through holes, wherein in a state where said front and rear flanges of said center frame are placed respectively on said front mounting plate and said rear mounting plate of said left and right side frames, bolts are inserted in said front bolt through holes, rear bolt through holes and said female bolt holes, thereby mounting said left and right side frames to said center frame, wherein each of said left and right side frames has an idler wheel disposed at one end and a drive wheel disposed at another end, wherein a plurality of upper roller devices are positioned between said idler wheel and said drive wheel to be spaced from each other and disposed on said upper surface plate of each of said left and right side frames, and wherein an inclined cover is disposed between said respective upper roller devices to be obliquely inclined downwards from said inner surface plate toward said outer surface plate on each of said left and right side frames.

* * * * *